Sept. 21, 1965 E. BYRON 3,207,126

MASK CHANGER MEANS FOR VACUUM DEPOSITION DEVICE

Filed Nov. 14, 1961 2 Sheets-Sheet 1

ERNEST BYRON
INVENTOR

BY W. O. Quesenberry
Claude Funkhouser
ATTORNEYS

ERNEST BYRON
INVENTOR

BY W. O. Duesenberry
Claude Funkhouser
ATTORNEYS

United States Patent Office 3,207,126
Patented Sept. 21, 1965

3,207,126
MASK CHANGER MEANS FOR VACUUM DEPOSITION DEVICE

Ernest Byron, Rockville, Md., assignor to the United States of America as represented by the Secretary of the Navy Filed Nov. 14, 1961, Ser. No. 152,365
5 Claims. (Cl. 118—49)

The present invention relates in general to thin film circuits and more particularly to an apparatus for producing thin film circuits.

Recent requirements for miniaturization have caused a great deal of activity in the field of micro-electronics. One of the schemes advanced for the fabrication of these minute circuits is based upon their construction from thin vacuum deposited films. Thin film circuits can be made extremely small and with very close tolerances, and they lend themselves readily to the use of many different materials in the same circuit. In addition, by this process the components are all evaporated on a single substrate thereby significantly reducing the number of soldered connections required. The result is a more rugged and dependable circuit.

As applicable and desirable as the vacuum deposition process is to the fabrication of micro-electronic circuits, certain major difficulties have prevented profitable use of the process for this new application. Most serious of all is the lack of a means to change the necessary masks without breaking the vacuum in the chamber. Where the deposition of successive layers is required, a number of masks is needed to form the desired configurations. From a standpoint of time alone, it is imperative that these masks be changed between each deposition without breaking the vacuum in the chamber. It takes several hours to build up a sufficient vacuum within the chamber to satisfactorily carry out the coating process. If the circuit requires the deposition of several layers, the entire circuit will consume several days in its completion unless done in one stage.

A second major difficulty is the accomplishment of proper registration between the substrate and the succession of masks to be used. Micro-electronic circuits necessarily require extremely close tolerances due to their minute size. Accuracies to within 1 mil are very common. The slightest errors due to improper mask registration will produce a faulty circuit.

It is accordingly an object of the present invention to provide an apparatus for vacuum depositing thin film circuits with high speed and accuracy.

Another object of the present invention is to provide an apparatus for expeditiously vacuum depositing selective patterns without breaking the vacuum within the vacuum chamber.

Still another object of the present invention is to provide a means for providing proper registration between the substrate and a plurality of masks used for the deposition of successive layers.

A further object of the invention is to provide an apparatus for accurately and successively positioning a plurality of masks within a vacuum chamber from without the chamber.

Other objects and many of the attendant advantages of this invention will be readily appreciated as the same becomes better understood by reference to the following detailed description when considered in connection with the accompanying drawings, wherein.

Vacuum depositing is a very well-known coating process and is particularly adapted to the fabrication of thin film circuits. The material to be deposited is introduced into the vacuum chamber and evaporated through a mask onto a substrate of glass or other material. Successive layers of metal and insulating materials and other compositions may be applied to the minute glass substrate to build up large complicated circuits. The more complex the circuit, i.e., the more components it contains, the more masks will be required to fabricate the circuit.

The masks used for the fabrication of these circuits are made from 1 oz. sheet copper and are prepared by a technique similar to the photographic method used for making printed circuits. Copper is preferred because it is easily etched but nickel, mu metal and stainless steel can also be used for masks. Because of its structural properties and resistance to corrosion, stainless steel is particularly advantageous. However, due to excessive undercutting, its use to date has been limited to masks where precision is not essential.

It is found that during the etch process, a metal sheet will be undercut an amount which is approximately equal to the thickness of the sheet. There are techniques for alleviating the effects of undercutting such as etching from both sides of the sheet, however, these methods are used only when extremely fine lines are required or thicker metals are etched. The only practical solution to the problem is to use extremely thin sheets.

Figure 1:
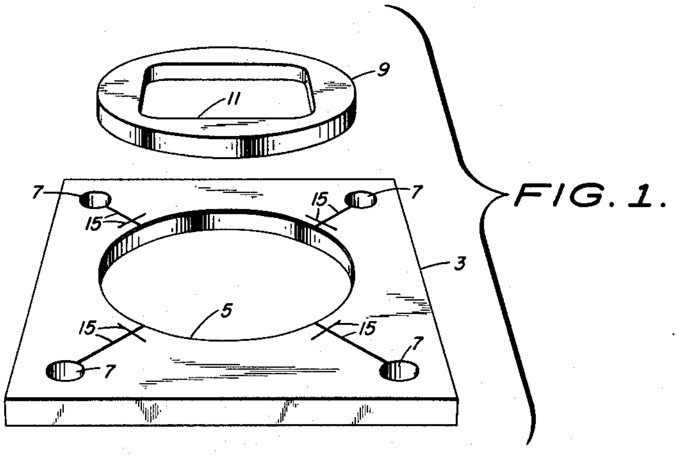
FIG. 1 is an exploded perspective of the mask holder forming part of the invention.

The advantages gained in using very thin copper are negated, however, unless some means of supporting the copper without wrinkling or bending is employed. This is achieved according to the invention through the use of a pair of frames shown in FIG. 1. Frame 3 is rectangular in shape and has a rather large circular aperture 5 centrally located therein. Frame 3 also contains guide holes 7 located in the four corners thereof and equally spaced from each other. The second frame 9 shown in FIG. 1 is circular in shape and has a central rectangular aperture 11 in the center thereof. Frame 9 is substantially the same size as aperture 5 in frame 3 so that it may be inserted within the aperture 5.

Figure 2:
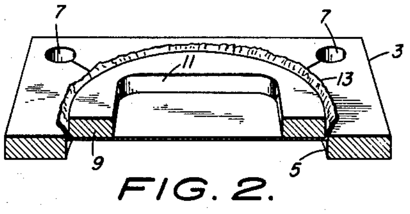
FIG. 2 is a section of the mask holder of FIG. 1 showing the insertion of the mask therein.

FIG. 2 shows the manner in which the frames are utilized to support the sheet copper. The copper sheet 13 is first spread over frame 9 until it is relatively taut. Frame 9 is then inserted into the aperture 5 on frame 3 thereby stretching the copper sheet 13 and locking it into position. Frames 3 and 9 are dimensioned so that insertion of frame 9 with the copper sheet covering into frame 3 will produce a snug fit. The size of aperture 11 is not critical and need only be larger than the circuit to be etched into the copper sheet.

Since a plurality of masks will be necessary to fabricate a circuit on a single substrate, it is imperative that each mask register with the substrate in an identical manner. This is especially true with micro-electronic circuits because of their minute size and close tolerances. A reference for proper registration of the etched circuit on each mask is provided through the use of indicia marks 15 scored into the face of frame 3. These marks must be accurately located on each frame. The spacing for these marks is determined by a set of master marks on the circuit drawing from which the photo-positives used in the etch process are derived. During the etch process the photo-positives of the particular portion of the circuit to be reproduced by the mask are positioned on the mask holder so that the indicia marks on the photo-positive register with the indicia marks 15 on the frame. In this way the etched circuitry will be located in exactly the same position on each mask. Now, if the guide holes 7 are located precisely on each frame 3, the different circuit portions on each frame may be accurately registered by merely lining up the guide holes on each mask holder.

Figure 3:
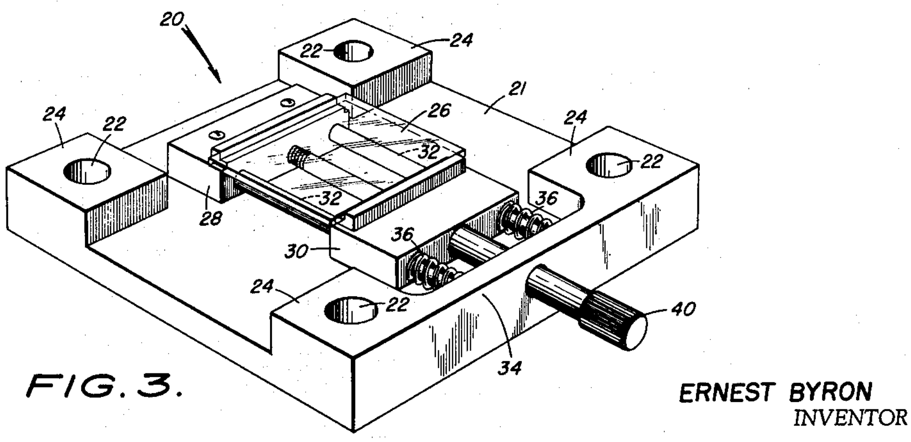
FIG. 3 is a perspective of the substrate holder which forms part of the invention.

The complement of the mask holder is the substrate holder designated generally as 20 in FIG. 3. The frame 21 of the substrate holder is the same size and shape as the frame 3 of the mask holder and contains four guide holes 22 located and dimensioned in an identical fashion to guide holes 7 in frame 3. Frame 21 also contains several spacing lugs 24 located in each corner thereof which serve to maintain the proper spacing between the mask holder and the substrate holder during operation of the mask changer.

The substrate 26 is held in a vise clamp mounted on frame 21 consisting of a pair of jaws 28 and 30. Jaw 28 is fastened to the frame 21 while jaw 30 is movably mounted on a pair of guide rods 32. The rods 32 are mounted between jaw 28 and an end flange 34 on frame 21. In order to prevent loss of the clamping action due to the different coefficients of expansion between the vise clamp and the substrate during the heating of the substrate, the vise clamp is spring loaded by springs 36. Adjustment of the vise clamp is effected by movement of jaw 30 along guide rods 32 by means of an adjusting rod 40. Rotation of the rod 40 will provide this movement.

Figure 4:
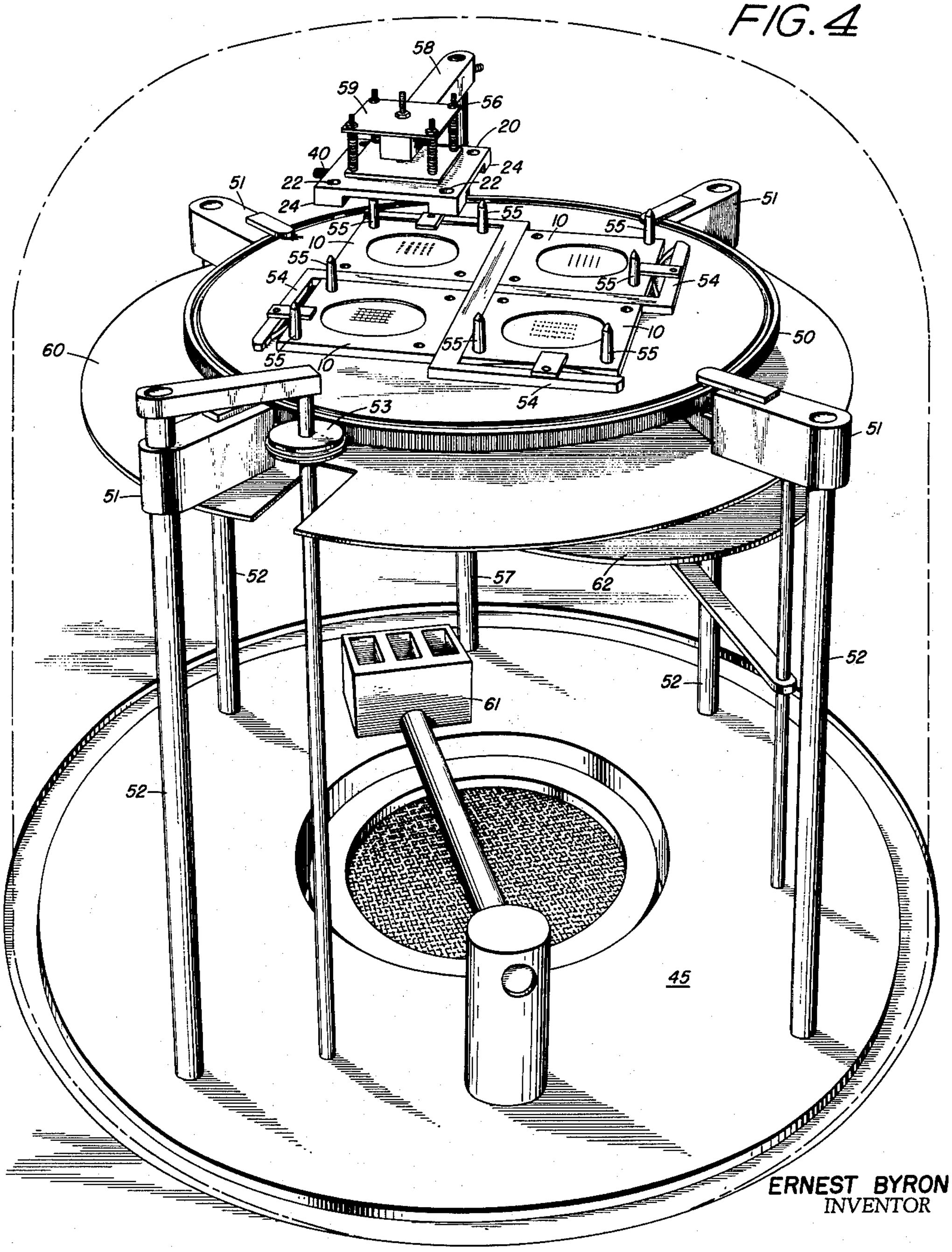
FIG. 4 is a perspective of the mask changer constructed according to the invention.

FIG. 4 shows a mask changer built in accordance with the invention and mounted on a conventional vacuum pump 45. The bell jar is shown in phantom line about the structure of the invention and is mounted on the vacuum pump 45 in the conventional manner. The other common vacuum pump components have been eliminated from the figure so as to provide a clearer illustration of the invention. It should be understood that the elements common to an evacuation chamber are necessary to the invention and should be provided during practice of the invention.

A mask carrier 50 is mounted for rotation on a plurality of supports 51 clamped to the support frame 52 of the vacuum chamber. The supports 51 contain Teflon bearings which are designed to ride in circular grooves in the top and bottom of the carrier 50. Rotation of the carrier is accomplished through a simple rim drive 53 operated by motor or by hand from without the vacuum chamber. Any suitable means for rotation or support of the carrier which performs the required function would be satisfactory.

Four mask holders 10 are mounted on the mask carrier 50 in spring loaded clamps 54 in a symmetrical fashion so that through rotation of the carrier 50 the masks may be successively moved into the proper position for alignment with the substrate holder 20. Into at least two of the guide holes 7 on each mask holder 10 is inserted a tapered indexing pin 55 which has a maximum diameter equal to the diameter of the guide holes 22 in substrate holder 20.

The substrate holder 20 is held in position over the mask carrier 50 by a support rod 56 which is movably mounted within a support tube 57. Vertical movement of the rod 56 may be effected by any suitable gear arrangement. The substrate holder is spring loaded to a support arm 58 by means of frame 59. Support arm 58 is in turn connected to movable support rod 56. Movement of rod 56 within cylinder 57 will permit sufficient vertical motion in the substrate holder 20 to effect engagement and disengagement of the substrate holder 20 with each mask holder 10 as it is successively moved into position.

A shield 60 is located directly below the mask carrier 50 to prevent vapor from depositing on those masks not in use. This shield contains an aperture (not shown)

which is located in line with the substrate holder 20. Thus vapor will pass only through the mask which is directly below the substrate holder 20. The mask carrier 50 contains similar sized apertures located beneath each mask.

The materials to be deposited are contained in an evaporating boat 61, comprising a plurality of vessels, of any standard configuration supported about ten inches directly below the substrate. A movable shield 62 is provided directly above the evaporating boat 61 to cut off the vapor when necessary.

Substrate heating is accomplished by use of a high wattage flood light (not shown) which may be inserted within the bell jar directly above the substrate holder 20. Temperatures in excess of 800° F. have been reached using this method. Heating of the substrate is necessary to effect proper adhesion of the vapor materials thereto.

In operation, the vacuum chamber is evacuated to a pressure of $4\times10^{-5}$ mm. of Hg. It would be preferable to evaporate in the $10^{-6}$ mm. of Hg region when possible since the mean free path of the vapor molecules and the rate of evaporation would increase considerably.

The first mask is rotated into position beneath the substrate. Since the indexing pins 55 are tapered and the substrate holder 20 is spring loaded, the mask need not be accurately located beneath the substrate. The substrate holder 20 is then lowered onto the first mask so that the indexing pins 55 enter the guide holes 22 in the substrate holder 20 and the spacing lugs 24 contact the surface of the mask holder 10. When the portion of the circuit outlined by the mask is deposited in sufficient thickness on the substrate, the substrate holder is raised and the second mask is rotated into position. The second circuit portion which is outlined by the second mask is then deposited in a manner similar to the first circuit portion. The cycle is repeated until the circuit is completed using all available masks.

In this manner a circuit requiring several depositions may be fabricated quickly and with great accuracy within the vacuum chamber without breaking the chamber vacuum. The mask changer may be set up for hand operation or it may be motorized so as to perform all of its operations automatically and without supervision.

The mask carrier 50 is shown having four masks, however, it is to be understood that this carrier may be provided with a greater number of masks by simply locating the masks along the perimeter of the wheel. The carrier 50 would then have to be supported through its center rather than along its edges. In this case the rim drive could be replaced by a central gear drive. This configuration would also permit the use of a much thinner carrier.

Obviously, many modifications and variations of the present invention are possible in the light of the above teachings. It is therefore to be understood that within the scope of the appended claims the invention may be practiced otherwise than as specifically described.

What is claimed is:

1. In an apparatus for fabricating thin film circuits of the type comprising a vacuum chamber, means for evacuating said chamber, a substrate mounted in said chamber for supporting a circuit, a circular rotatably arranged mask carrier, a plurality of mask holders arranged within said chamber in proximity to said substrate and supported by said mask carrier, a plurality of masks each arranged within a separate one of said mask holders, means for registering each mask holder with said substrate, and evaporating means within said chamber for supplying a vapor to said substrate, said mask carrier being located between said substrate and said vapor supplying means so that said vapor is passed through one of said masks before contacting said substrate, a plurality of pairs of concentrically mounted frames, each of said pairs of frames securing one of said masks, the outer of each of said pairs of frames having a plurality of guide holes extending vertically therethrough, a plurality of guide pins each positioned in a separate one of said guide holes and extending outwardly of its associated pair of frames, a substrate holder having a base, a plurality of spaced spacing lugs located on said base, each having a guide hole extending vertically therethrough and capable of receiving one of said guide pins, a pair of spaced parallel vise jaws connected to said base and mounting said substrate, a plurality of spaced parallel guide rods connected to said base and passing through one of said pair of vise jaws and extending into the other of said pair of vise jaws, enabling one of said pair of vise jaws to be slidably positioned with respect to the other of said pair of vise jaws, a spring disposed about each of said guide rods between one of said pair of vise jaws and said base, a vertical support rod, a horizontal arm connected to said support rod, a support frame connected to said horizontal arm, spring means for connecting said substrate holder to said support frame, and means for providing vertical movement to said support rod.

2. The invention as recited in claim 1 additionally including means for registering each of said masks with its associated pair of concentrically mounted frames.

3. In an apparatus for fabricating elements by vapor deposition, a rotatable circular disk having a plurality of apertures therein, a plurality of masks, a plurality of pairs of concentrically mounted frames, each of said pairs of frames securing one of said masks, the outer of each of said pairs of frames having a plurality of guide holes extending vertically therethrough, means for securing each of said pairs of concentrically mounted frames and its associated mask over a separate one of the apertures in said rotatable circular disk, a plurality of guide pins each positioned in one of said guide holes and extending outwardly of its associated pair of frames, a substrate holder having a base, a plurality of spaced spacing lugs located on said base, each having a guide hole extending vertically therethrough and capable of receiving one of said guide pins, a pair of spaced parallel vise jaws connected to said base, a pluraílty of spaced parallel guide rods connected to said base and passing through one of said pair of vise jaws and extending into the other of said pair of vise jaws enabling one of said pair of vise jaws to be slidably positioned with respect to the other of said pair of vise jaws, a spring disposed about each of said guide rods between one of said pair of vise jaws and said base, a vertical support rod, a horizontal arm connected to said support rod, a support frame connected to said horizontal arm, spring means for connecting said substrate holder to said support frame, means for providing vertical movement to said support rod, a plurality of vessels containing vaporizable materials, said disk being located between said substrate and said vessels so that vapor from said vessels is passed through one of said masks before contacting said substrate.

4. The invention as recited in calim 3, additionally comprising means for registering each of said masks with its associated pair of concentrically mounted frames.

5. The invention as set forth in claim 4, additionally comprising a stationary shield beneath said disk having an aperture therein in registration with said substrate, and wherein said means for registering each of said masks with its respective pair of concentrically mounted frames includes a plurality of indicia marks on a portion of each of said pair of concentric frames.

References Cited by the Examiner

UNITED STATES PATENTS

| | | | |
|---|---|---|---|
| 2,160,981 | 6/39 | O'Brien | 118—49 X |
| 2,969,296 | 1/61 | Walsh | 117—106 X |
| 3,117,025 | 1/64 | Learn et al. | 118—49 |

CHARLES A. WILLMUTH, *Primary Examiner.*

RICHARD D. NEVIUS, *Examiner.*